(12) United States Patent
Tepperman et al.

(10) Patent No.: US 8,768,697 B2
(45) Date of Patent: Jul. 1, 2014

(54) METHOD FOR MEASURING SPEECH CHARACTERISTICS

(75) Inventors: Joseph Tepperman, Los Angeles, CA (US); Theban Stanley, Boulder, CO (US); Kadri Hacioglu, Boulder, CO (US)

(73) Assignee: Rosetta Stone, Ltd., Arlington, VA (US)

( * ) Notice: Subject to any disclaimer, the term of this patent is extended or adjusted under 35 U.S.C. 154(b) by 632 days.

(21) Appl. No.: 12/696,222

(22) Filed: Jan. 29, 2010

(65) Prior Publication Data

US 2011/0191104 A1 Aug. 4, 2011

(51) Int. Cl.
*G10L 15/00* (2013.01)

(52) U.S. Cl.
USPC ........... 704/236; 704/211; 704/243; 434/156; 434/185

(58) Field of Classification Search
CPC ......... G10L 15/02; G10L 15/08; G10L 15/10; G10L 17/26; G10L 13/08; G09B 19/04; G09B 19/06; G09B 5/04
USPC ............................ 704/9, 211, 270, 236, 243; 434/156–186
See application file for complete search history.

(56) References Cited

U.S. PATENT DOCUMENTS

| | | | |
|---|---|---|---|
| 6,109,923 A | 8/2000 | Rothenberg | |
| 6,226,611 B1 * | 5/2001 | Neumeyer et al. | 704/246 |
| 6,336,089 B1 * | 1/2002 | Everding | 704/1 |
| 6,358,054 B1 | 3/2002 | Rothenberg | |
| 6,397,185 B1 | 5/2002 | Komissarchik et al. | |
| 7,647,224 B2 * | 1/2010 | Ariu et al. | 704/231 |
| 2004/0006461 A1 * | 1/2004 | Gupta et al. | 704/200 |
| 2005/0144010 A1 | 6/2005 | Peng | |
| 2005/0255431 A1 | 11/2005 | Baker | |
| 2006/0057545 A1 * | 3/2006 | Mozer et al. | 434/156 |
| 2006/0110712 A1 * | 5/2006 | Julia et al. | 434/156 |
| 2006/0136206 A1 * | 6/2006 | Ariu et al. | 704/246 |
| 2007/0009865 A1 | 1/2007 | Palacios | |
| 2007/0015122 A1 | 1/2007 | Palacios | |
| 2007/0061139 A1 * | 3/2007 | Shen et al. | 704/234 |
| 2008/0010068 A1 * | 1/2008 | Seita | 704/257 |
| 2010/0004931 A1 | 1/2010 | Ma et al. | |
| 2011/0208508 A1 | 8/2011 | Criddle | |
| 2012/0065977 A1 | 3/2012 | Tepperman et al. | |

FOREIGN PATENT DOCUMENTS

WO WO 2008/033095 A1 * 3/2008

OTHER PUBLICATIONS

Asu & Nolan (2005)Asu, E. L. & Nolan, F. (2005). Estonian rhythm and the Pairwise Variability Index. In Proceedings of Fonetik 2005 (pp. 29-32). Gothenburg.*

(Continued)

*Primary Examiner* — Douglas Godbold
*Assistant Examiner* — Ernest Estes

(57) ABSTRACT

In some embodiments, a method includes measuring a disparity between two speech samples by segmenting both a reference speech sample and a student speech sample into speech units. A duration disparity can be determined for units that are not adjacent to each other in the reference speech sample. A duration disparity can also be determined for the corresponding units in the student speech sample. A difference can then be calculated between the student speech sample duration disparity and the reference speech sample duration disparity.

14 Claims, 4 Drawing Sheets

(56) References Cited

OTHER PUBLICATIONS

Grabe & Low (2002)Grabe, E., & Low, E. L. (2002). Durational variability in speech and the rhythm class hypothesis. In N. Warner, & C. Gussenhoven (Eds.), Papers in laboratory phonology 7 (pp. 515-546). Berlin: Mouton de Gruyter.*

Vainia et al.: "New Method for Delexicalizaton and it Application to Prosodic Tagging for Test-to-Speech Synthesis," Interspeech 2009 Brighton, pp. 1703-1706.

Pannekamp, et al.: "The Brain's Response to Hummed Sentences," (3 pgs.).

Pagel, et al.: "A New Method for Speech Delexicalization, and Its Application to the Perception of French Prosody," (4 pgs.).

"Musical Instrument Digital Interface," (14 pgs.).

Tepperman, Joseph, et al., Office Action for U.S. Appl. No. 12/878,402, dated Jun. 26, 2012, 13 pgs.

Tepperman, Joseph, et al., Office Action for U.S. Appl. No. 12/878,402, dated Jun. 7, 2012, 13 pgs.

International Search Report and Written Opinion, dated Apr. 20, 2011 of International Application No. PCT/US11/25986, filed: Feb. 2011.

Hardison, Debra M., Generalization of Computer-Assisted Prosody Training: Quantitative and Qualitative Findings, Language Learning & Technology, Michigan State University, Jan. 2004, vol. 8, No. 1, pp. 34-52.

Language Learning & Technology, Jan. 1999, vol. 2 No. 2, pp. 62-76 online (http://llt.msu.edu/vol2num2/article3/): Ezkenazi, Using Automatic Speech Processing for Foreign language Pronunciation Tutoring: Some Issues and a Prototype.

* cited by examiner

METHOD FOR MEASURING SPEECH CHARACTERISTICS

BACKGROUND OF THE INVENTION

The present invention relates generally to teaching machines and, more particularly concerns a system and method for teaching a language.

Traditional methods for teaching a language, in particular a foreign language, are far from enjoyable for students. Students spend a great deal of time learning rules of grammar and syntax and generally learn by memorizing words in the target language (the language being learned) that are translations of corresponding words in a source language. The only exposure to correct pronunciation might be on a recording or during discussions in a classroom. On such occasions, the student finds himself mentally composing his recitation in his native language and then translating it. The usual result is a halting, stilted recital, replete with grammatical and syntactic errors introduced by the translation process. The foregoing approach generally does not enable the language learner to converse fluently in the target language.

In contrast, upon first learning a language, young children are fully immersed in a natural learning process in which they learn words, grammar and syntax interactively through deductive reasoning, in context, and by emulating others. In time, children develop a flowing communication style, without the need to translate or to be concerned about rules. It would be desirable to be able to emulate this kind of learning process in learning a second language.

Systems of teaching a user language using immersion are known to some extent in the prior art. However, to best measure the user's progress, the language student should be prompted to speak naturally. Simply showing the user target language text to be read aloud is less than optimum, because read speech is not spoken the same way as natural speech not being read. Thus, attempting to gauge student progress by measuring an ability to read prepared text is generally not effective.

An existing method for measuring rhythmic contrast for an utterance is the use of the Pairwise Variability index (PVI) which involves determining the mean difference between pairs of adjacent syllables over an entire vocal utterance (also referred to herein as a speech sample). However, the use of adjacent syllables for measuring rhythm is of limited value in assisting a language learner to more accurately mimic native speech in the language being taught. Accordingly, there is a need in the art for an improved system and method for comparing and/or contrasting the rhythm of two or more speech samples.

SUMMARY OF THE INVENTION

According to one aspect, the present invention is directed to a method for measuring a disparity between two speech samples, comprising: recording a reference speech sample spoken by a native speaker; recording a speech sample spoken by a language student; generating digital data files representative of the reference and student speech samples, thereby providing a reference speech data file, and a student speech data file, the speech sample data files including information indicative of sound intensity levels as a function of time over the chronological durations of the respective speech samples; segmenting the reference and student speech data files into respective reference and student speech-unit data files, with each speech-unit data file including a sequence of speech units over its speech sample duration; determining a duration disparity between a first speech unit and a second speech unit, that is not adjacent to the first speech unit, within the reference speech-unit data file, thereby providing a reference speech-unit duration disparity; determining a duration disparity between first and second speech units in the student speech-unit data file that correspond to the locations in the sequence of speech units of the first and second speech units in the reference speech-unit data file, thereby generating a student speech-unit duration disparity; and calculating a difference between the student speech-unit duration disparity and the reference speech-unit duration disparity.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
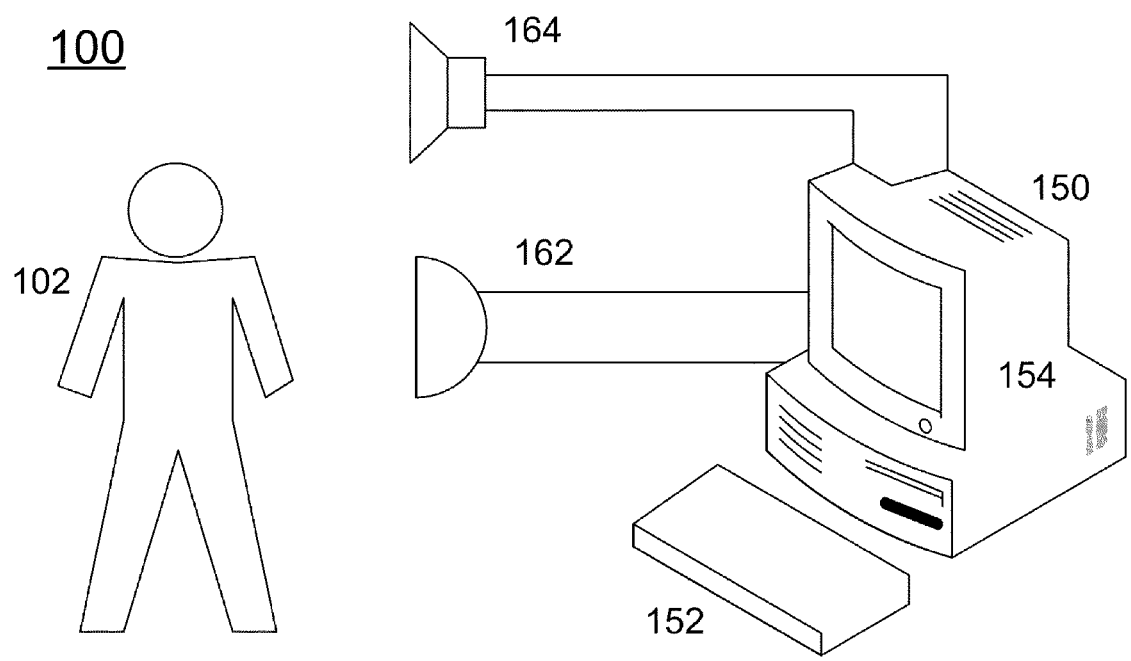
FIG. 1 is a schematic block diagram of a learning environment including a computer system and audio equipment suitable for practicing an embodiment of the present invention.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

An embodiment of the present invention is directed to evaluating suprasegmental parroting produced by students of English including but not limited to students starting from the Japanese language. The speech data used in the template based scoring experiments herein is divided into three subcorpora: Japanese learner parroting, Native English speaker parroting, and reference audio prompts.

In one embodiment, recordings may be made using 16-bit resolution digital representations of sound within the vocal utterances, and the utterances may be sampled at a sampling frequency of 16 kHz. With this approach, the speakers parroted some subset of one hundred English phrases that were selected so as to provide a variety in length, subject matter, and suprasegmental content. However, in alternative embodiments, analog representations of the sound may be sampled at rates above or below 16 KHz. Moreover, the digital data representations of sound within the vocal utterances may have resolutions above or below the 16-bit resolution discussed above.

In one embodiment, the reference speech samples were produced by four professional voicers (two male, two female). Recordings of the speech samples were processed and edited (including using multiband compression and equalization) to minimize noise and maximize intelligibility. To enhance intelligibility of the voice prompts, the utterances of the voicers were enunciated more deliberately and clearly than comparable statements typically would be by native speakers in ordinary conversation, or even when reading formally. But as prompts for the purpose being pursued herein, the speech samples as described above are appropriate. The intonation, rhythm, and phonetic quality of the prompts were unambiguous which is beneficial for purposes of instruction and imitation.

A wide range of proficiency was present among the student speakers from whom speech sample data was collected. Moreover, a variety of recording conditions prevailed. The recordings selected for the speech data gathering were checked to ensure that they were at least devoid of noise and that they were grammatical, i.e. that the student speaker produced at least a reasonable subset of the words in the prompt.

The students were not explicitly told to parrot the prompts' suprasegmental effects. Even so, the intonation and rhythm of the prompts wielded significant influence over the students. For example, to contrast a previous photo of a broken television, the professional voicer stated "This television works" with a strong pitch accent on the word "works." A contrastive pitch accent could have allowably gone on any of the words in "This television works" but, across the board, the Japanese learners followed the prompt's choice, many going as far as to take on the professional voicer's emphatic style.

To investigate the upper bound on parroting accuracy, the applicants also collected in-house recordings from native speakers of English. Each native speaker endeavored to match the voicer's rhythm and intonation as closely as possible. The speakers were allowed to listen to the prompt and record their own version as many times as they wanted. The speakers were not professional voicers. Although the conditions present for the native speakers were not identical to those present for the Japanese speakers, two sets of very different recordings resulted: one with presumably proficient native English parroting, and one with English learner parroting by a group of language learners having a range of English language proficiency. Below, this disclosure addresses novel systems and methods to effectively measure disparities in rhythm between students and native speakers, based in part on the results of the above-described voice data acquisition.

An objective of one embodiment of the invention is to generate a numerical measure of the disparity between the rhythm and/or sound of a language student reading and uttering a given text sequence and the sound of a proficient native speaker reading and uttering the same text sequence. Such measuring or "scoring" may involve suprasegmental parroting, that is, the imitation of sounds that extend over a plurality of speech segments, which are also referred to herein as speech units.

To estimate scores for suprasegmental parroting, we begin by automatically segmenting the student's speech into syllables and generating segment-level (in this case, syllable-level) acoustic scores. With this syllable segmentation, we compare the student's segmentation to that of the reference prompt, and generate an appropriate score for rhythm similarity.

In one embodiment, automatic speech segmentation was performed using Viterbi decoding of the target utterance using acoustic Hidden Markov Models of phonemes and Forced Alignment of the target sequence of phonemes to automatically generate phoneme segmentation times.

The segmentation process provided both word-level and phoneme-level alignments of the speech data. The decoded sequence of phonemes was then consolidated into syllables based on each word's expected syllabification according to a pronunciation dictionary. The decoding grammar allowed for possible word deletion and silence insertion, which is normal for speech samples from a language learner. Each phoneme was assigned a pronunciation score based on a standard likelihood ratio. These scores were aggregated to give an overall score for the pronunciation of an entire utterance FIG. 1 is a schematic block diagram of a learning environment 100 including a computer system 150 and audio equipment suitable for teaching a target language to student 102 in accordance with an embodiment of the present invention. Learning environment 100 may include student 102, computer system 150, which may include keyboard 152 (which may have a mouse or other graphical user-input mechanism embedded therein) and/or display 154, microphone 162 and/or speaker 164. The computer 150 and audio equipment shown in FIG. 1 are intended to illustrate one way of implementing an embodiment of the present invention. Specifically, computer 150 (which may also referred to as "computer system 150") and audio devices 162, 164 preferably enable two-way audio-visual communication between the student 102 (which may be a single person) and the computer system 150.

In one embodiment, software for enabling computer system 150 to interact with student 102 may be stored on volatile or non-volatile memory within computer 150. However, in other embodiments, software and/or data for enabling computer 150 may be accessed over a local area network (LAN) and/or a wide area network (WAN), such as the Internet. In some embodiments, a combination of the foregoing approaches may be employed. Moreover, embodiments of the present invention may be implemented using equipment other than that shown in FIG. 1. Computers embodied in various modern devices, both portable and fixed, may be employed including but not limited to Personal Digital Assistants (PDAs), cell phones, among other devices.

Figure 2:
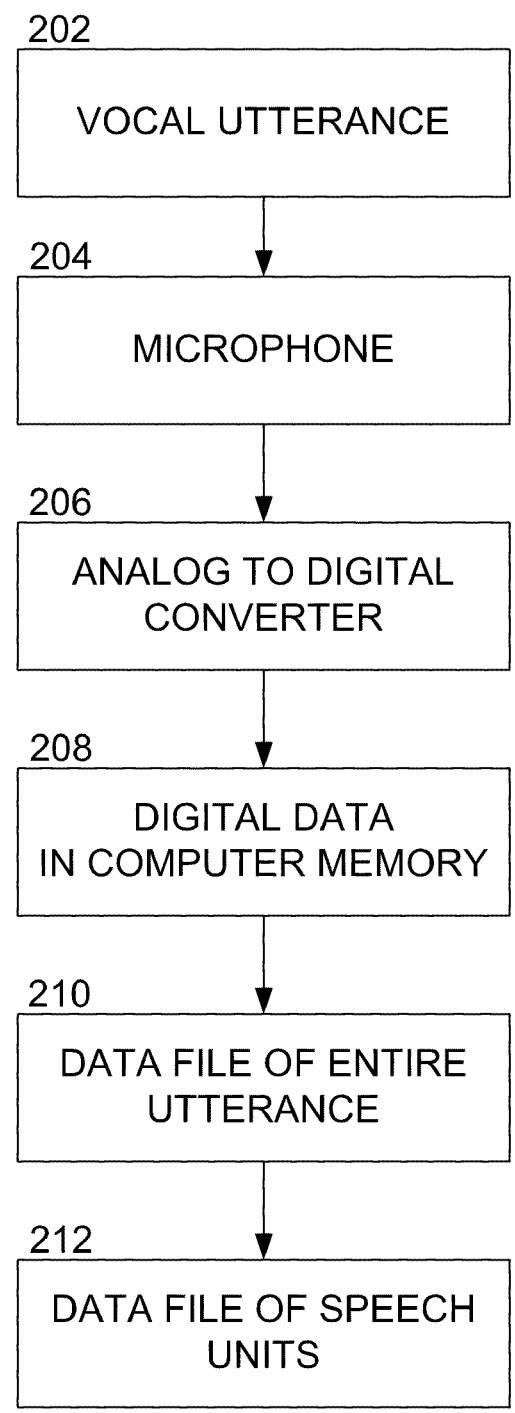
FIG. 2 is a block diagram of a system for generating computer data files representative of audible speech, such as sample utterances by language students and/or by native speakers in accordance with an embodiment of the present invention.

FIG. 2 is a block diagram of a system 200 for generating computer data files representative of audible speech, such as sample utterances by language students and/or by native speakers in accordance with an embodiment of the present invention. FIG. 2 is provided to list and identify the various types of signals and information as well as the audio and data processing equipment that may be employed in accordance an embodiment of the present invention.

At block 202, a speaker, who may be a language learner (i.e. a student), a native speaker providing a sample reading of a block of text, or an instructor, provides a vocal utterance. The vocal utterance, which is preferably spoken at a normal conversational volume level is preferably directed to a microphone 204. The microphone 204 preferably converts the audible sound of the utterance (also referred to as a speech sample) into an analog electrical signal representative of the audible utterance. The analog signal is preferably transmitted from microphone 204 to Analog-to-Digital Converter (ADC) 206 where the analog signal is preferably converted into digital data suitable for storage and manipulation by a digital computer, such as computer 150 of FIG. 1. In some embodiments, the microphone 204 and the ADC 206 may be incorporated within a single enclosure for the sake of convenience. In one embodiment ADC 206 may sample the analog data at 16 KHz (Kilohertz) using 16-bit resolution. However, in other embodiments, sampling rates lower than or greater than 16 KHz and may be used. Moreover, resolution higher than or lower than 16-bit resolution may be employed.

At step 208, the digital data obtained at the digital side of ADC 206 is preferably transmitted to a computer memory device for temporary and/or long-term storage so that the data is accessible to programs operating within computer 150. The digital data emerging from ADC 206 is preferably accumulated so as to provide a data file 210 representing an entire utterance (speech sample), that may, for example, represent an entire spoken English sentence (or still longer text portion) in a single data file (or plural data files) that is readily accessible to hardware and/or computer software seeking to access and/or manipulate the digital speech data. Thereafter, the digital speech data within data file 210 may be decomposed into speech units (also referred to herein as "speech segments") accompanied by suitable identifiers of the respective speech units, or otherwise accessed and manipulated to obtain data indicative of characteristics of the speech sample.

Speech may be decomposed into component parts, i.e. speech units, at a range of different levels. The levels of greatest interest herein are, in increasing degree of granularity: words, syllables, and phonemes. Herein, a phoneme is the smallest segmental unit of sound used within a word or syllable. However, other speech units such as consonants and/or vowels may be used in place of, or in addition to the speech units listed above.

The following discussion is directed to a rhythm measurement in which utterances are segmented at the level of syllables. Thereafter, a general method for measuring rhythm disparities between two speech samples is described. It will be appreciated that the present invention is not limited to segmenting at the syllable level, and that speech may be segmented at more granular levels such as at the phoneme level, or at less granular levels, such as at the word level, and that all such variations are intended to be included within the scope of the present invention.

Ideally, when comparing the rhythm of learner speech to the rhythm of reference speech, the number of syllables in the two speech samples is preferably the same. However, due to pronunciation variants in the recognition lexicon, the decoding of some student phrases may yield a different number of phonemes or syllables in the speech unit data file 212 (see FIG. 2) than the number yielded by decoding a reference speech sample.

For example, the word "temperature" (which was present in the corpus of one experimental speech sample) can be pronounced with three syllables or with four. In cases where the number of syllables did not match, the method disclosed herein backed off to word-level rhythmic analysis only for the word(s) with differing number of syllables. Also, to compensate for differences in speaking rate, the durations of the speech samples were linearly scaled so that the total duration of the reference speech sample, as represented in a speech-unit data file (212), was made equal to the duration of the speech-unit data file (212) of the language learner (student). This approach enables a more effective mathematical characterization of the relative durations of the syllables within each of the speech samples. We consider an example in which in a reference speech sample, the second syllable has the same duration as the first syllable, but in the learner speech sample, the second syllable is twice as long as the speech sample. Normalizing the total duration of the speech samples to the same value allows for simpler arithmetic to be employed to effectively compare and contrast the relation between the first and second syllables of the reference and learner speech samples. That is, the formula need only take account of the disparity in duration of the respective sets of first and second syllables to be indicative of a difference in rhythm between the two speakers. In contrast, if the total duration of the speech samples differed significantly (due to one speaker speaking more slowly throughout the speech sample), meaningfully comparing the relative lengths of the syllables would require substantially more complicated mathematical operations. The normalization of speech sample durations may be accomplished by scaling the learner speech sample duration, the reference speech sample, or both speech samples.

The rhythm of speech may be characterized not only by the durations of speech segments, but also by the contrast between various speech segments: such as between strong and weak segments, long and short segments, and/or stressed and unstressed segments. An existing approach for quantifying rhythmic contrast is the Pairwise Variability Index (PVI). PVI is used to calculate the mean difference in duration between pairs of adjacent speech segments (also referred to herein as "speech units"), which segments are usually syllables, over an utterance (i.e. a speech sample).

To directly compare the rhythms of two speakers, this disclosure describes a measurement called the Pairwise Variability Error (PVE). Given a sequence of student speech-unit durations $\{s_1, s_2, s_3, \ldots s_n\}$ (most of which will represent syllables, but which may occasionally represent words when the number of syllables in a student's spoken word does not match the number of syllables in the reference), and a sequence of corresponding reference speech-unit durations $\{r_1, r_2, r_3, \ldots r_n\}$. One embodiment of the rhythm scoring system and method disclosed herein is shown in Equation (1) below:

$$PVE = \frac{\sum_{i=2}^{N} \sum_{m=1}^{min(M,i-1)} |(s_i - s_{i-m}) - (r_i - r_{i-m})|}{\sum_{i=2}^{N} \sum_{m=1}^{min(M,i-1)} |s_i - s_{i-m}| + |r_i - r_{i-m}|}, \quad \text{(Eq. 1)}$$

where $s_i$ is a syllable (or other speech unit) at the location indicated by the value of "i" in a sequence of syllables in the student speech sample; $r_i$ is a syllable at a location corresponding to that of $s_i$, but in the reference speech sample. N is the total number of syllables in the speech sample. M−1 is a value corresponding to the largest speech-unit distance to be used in the rhythm calculation.

Equation (1) sums the absolute values of the "difference of differences" between pairs of syllables in the student and reference utterances, and then normalizes this sum by dividing by the total absolute difference, where the "total absolute difference" corresponds to the sum of the absolute values of the differences in duration between pairs of syllables in the student and reference speech samples. While the above discussion refers to the duration disparities in connection with pairs of syllables, in other embodiments, the speech segments for which duration disparities are calculated in Equation (1) may be words, consonants, vowels, or phonemes. Moreover, the PVE calculation in Equation (1) may be repeated for a given scaled student-reference pairing of speech samples using speech units at different levels of speech granularity. That is, the calculation of Equation (1) may be conducted separately for words, syllables, and/or phonemes, and thereby gather still more information with which to compare and contrast the speech patterns of a language student in relation to a reference speech sample.

If the student and reference durations for the various pairing of speech segments are nearly equal, the PVE score resulting from the Equation (1) tends toward zero. As the difference increases toward a maximum possible value, the PVE equation score approaches a value of "1."

The "m" variable in Equation (1) is an integer that provides a rhythmic context value. A value of m≥1, allows for comparisons between non-adjacent syllables that may be separated by a speech-unit distance anywhere from two (2) speech units on up to a maximum of M−1 speech units. The above an improvement over PVI (discussed above) which only calculates duration disparities between adjacent speech units.

Figure 3:
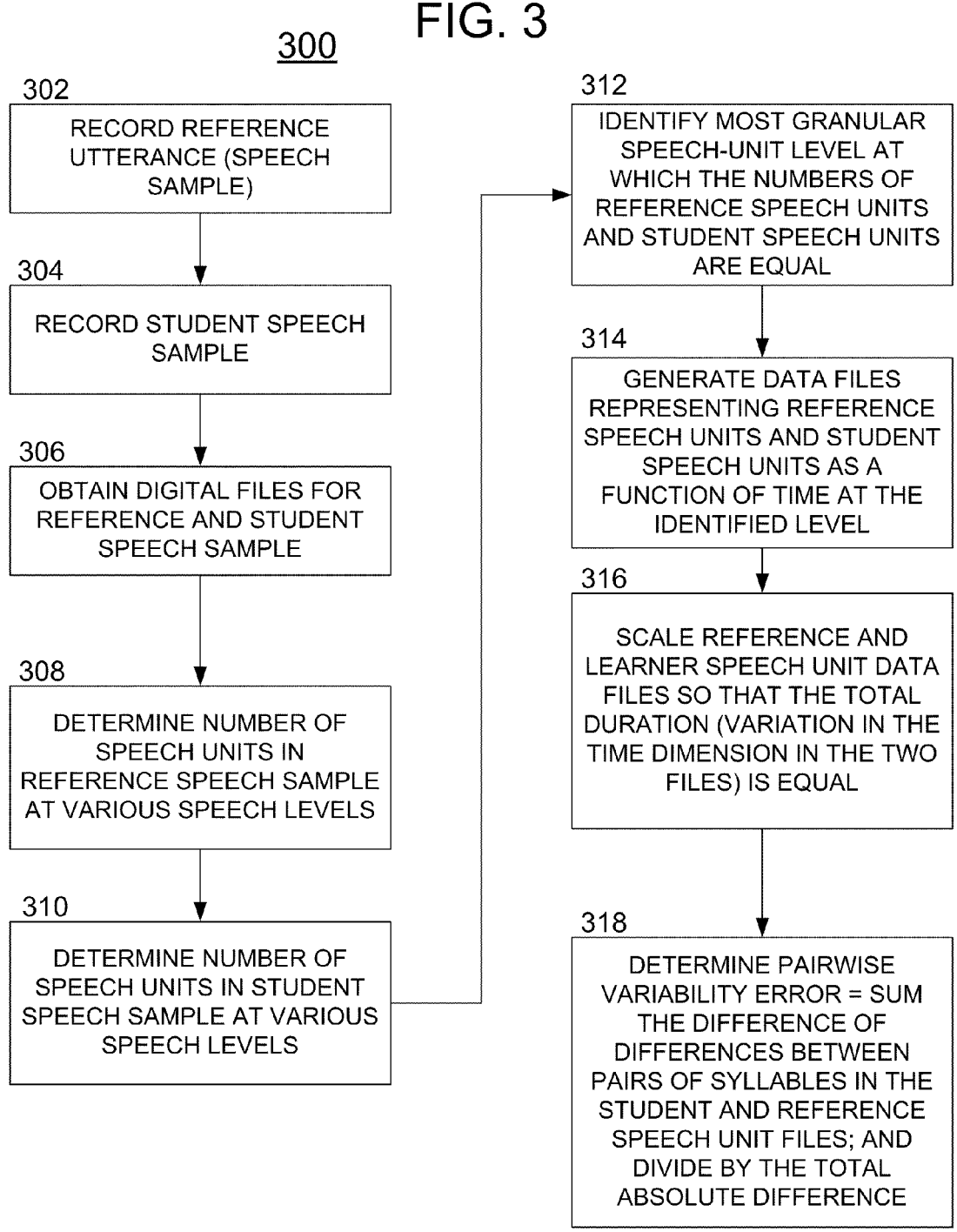
FIG. 3 is a flow diagram of a method for measuring a rhythm disparity between two speech samples in accordance with an embodiment of the invention.

FIG. 3 is a flow diagram of a method 300 for measuring a rhythm disparity between two speech samples in accordance with an embodiment of the invention. In this section, a discussion of a more generalized method for obtaining speech samples and comparing the rhythm characteristics thereof is provided.

At step 302, a reference speech sample is recorded, and data representing the speech is suitably stored in a computer memory device. At step 304, a student speech sample is recorded and similarly stored in a computer memory. At step 306, the method preferably obtains the digital files of both the reference and student speech samples. The method may then determine the number of speech units in the reference speech sample (308) and in the student speech sample (310) at various levels of speech granularity (i.e. phoneme, syllable, word, etc.). The most granular speech-unit level at which at which the numbers of speech units are the same between the reference and student speech samples is then preferably identified (312).

In an alternative approach, the method may determine the number of speech units in the speech sample at the phoneme level for both speech samples. If the number of phonemes are the same, the comparison speech unit count comparison may end there, and the method may proceed to use phonemes alone for the rhythm score computation. Where the number of phonemes for the reference and student speech samples differ for a single word, but is otherwise the same, the method 300 may compare the rhythm characteristics of the respective speech samples at the phoneme level for all but the single word (for which the phoneme number is different), and conduct the rhythm analysis at the word or syllable level for the word (or other speech segment) in which the phoneme counts differ between the two speech samples.

At step 314, data files representing the student and reference speech samples with the appropriate segmentation (i.e. into phonemes, syllables, or other speech granularity level) may be generated and stored in an accessible location in a computer memory. At step 316, if the total duration of the two speech samples is different, one or both of the speech sample files generated in step 314 may be scaled so as to normalize the total duration of the two speech samples to the same total duration. At step 318, the PVE (pairwise variability error) may be calculated in accordance with Equation (1), provided above.

Figure 4:
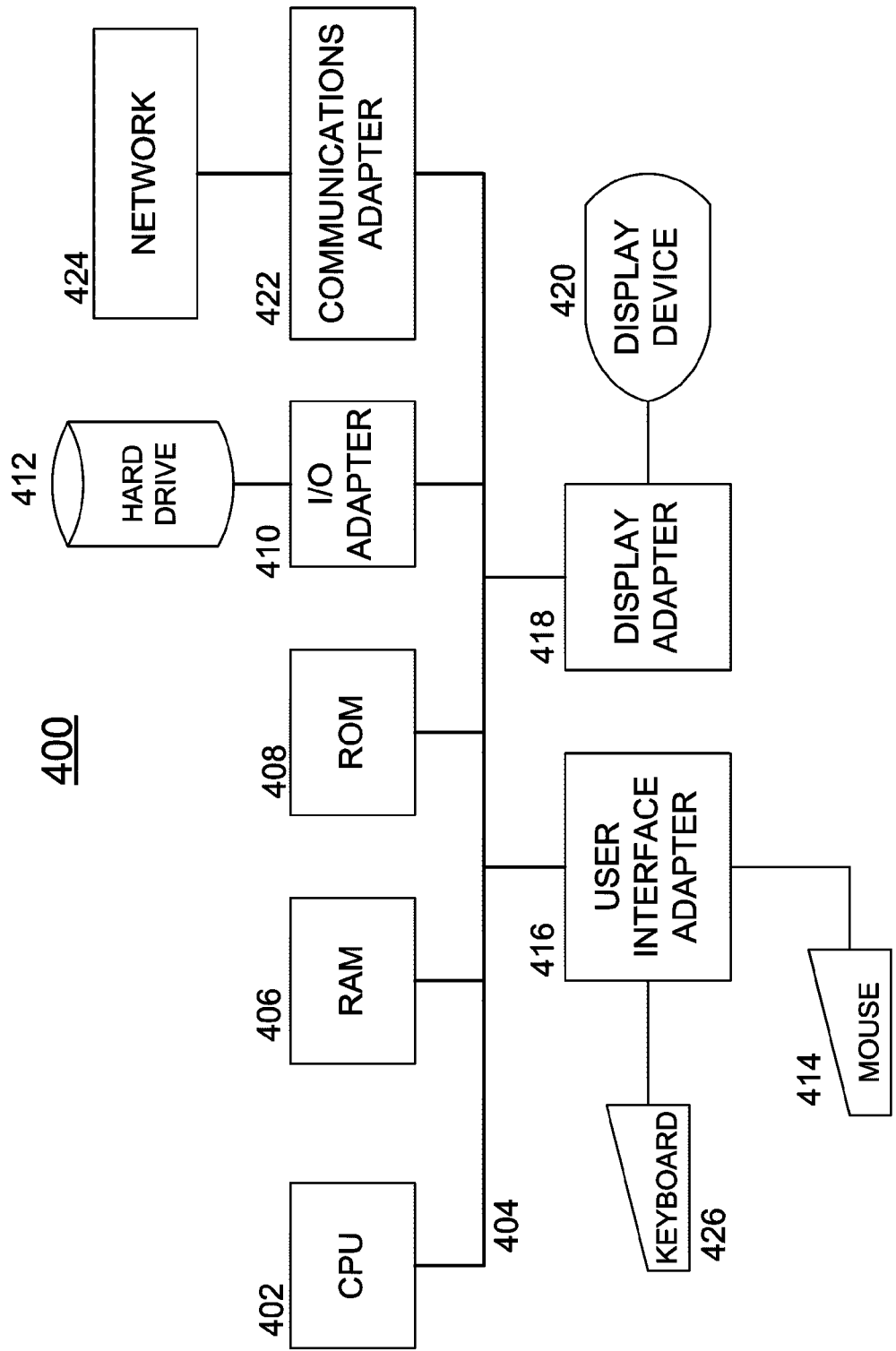
FIG. 4 is a block diagram of a computer system usable in conjunction with one or more embodiments of the present invention.

FIG. 4 is a block diagram of a computing system 400 adaptable for use with one or more embodiments of the present invention. Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs. I/O adapter 410 may connect storage devices, such as hard drive 412, a CD-ROM (not shown), or other mass storage device to computing system 600. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A non-transitory processor-readable medium storing code representing instructions to be executed by a processor, the code comprising code to cause the processor to:

record a reference speech sample spoken by a native speaker;

record a student speech sample spoken by a language student;

generate a reference digital data file representative of the reference speech sample and a student digital data file representative of the student speech sample, the reference digital data file including information indicative of a sound intensity level as function of time over a chronological duration of the reference speech sample and the student digital data file including information indicative of a sound intensity level as a function of time over a chronological duration of the student speech sample;

segment the reference digital data file into a reference speech-unit data file and the student digital data file into a student speech-unit data file, the reference speech-unit data file including a plurality of reference speech-units from the reference digital data file over a reference speech sample duration and the student speech-unit data file including a plurality of student speech-units from the student digital data file over a student speech sample duration; and generate a plurality of student speech-unit duration differences by calculating a difference in duration between each student speech-unit from the plurality of student speech-units and the remaining speech-units from the plurality of student speech-units.

2. The non-transitory processor-readable medium of claim 1, further comprising code to cause the processor to:

scale at least one of the reference speech sample or the student speech sample so that the total duration of the reference speech sample and the student speech sample are substantially the same.

3. The non-transitory processor-readable medium of claim 1, wherein a type of speech-unit is selected from at least one of phonemes, syllables, or words.

4. The non-transitory processor-readable medium of claim 1, further comprising code to cause the processor to:
determine the most granular level of speech in which a number of speech-units is the same for the reference speech sample and the student speech sample; and
compare a characteristic of one of the plurality of reference speech-units with the characteristic of a corresponding one of the plurality of student speech-units.

5. The non-transitory processor-readable medium of claim 1, wherein the calculating a difference in duration between each speech-unit from the plurality of student speech-units includes calculating a difference in duration between each phoneme in the student speech sample.

6. A method for measuring a disparity between two speech samples, comprising:
recording a reference speech sample spoken by a native speaker;
recording a student speech sample spoken by a language student;
in a computer process, generating a reference speech digital data file representative of the reference speech sample, the reference speech digital data file including information indicative of sound intensity levels as a function of time over a chronological duration of the reference speech digital data file;
in a computer process, generating a student speech digital data file representative of the student speech sample, the student speech digital data file including information indicative of sound intensity levels as a function of time over a chronological duration of the student speech digital data file;
in a computer process, segmenting the reference speech digital data file into a reference speech-unit data file the reference speech-unit data file including a sequence of speech units over a reference speech sample duration;
in a computer process, segmenting the student speech digital data file into a student speech-unit data file, the student speech-unit data file including a sequence of speech units over a student speech sample duration;
in a computer process, generating a reference speech-unit duration disparity based on a duration disparity between a first speech unit and a second speech unit, that is not adjacent to said first speech unit, within the reference speech-unit data file;
in a computer process, generating a student speech-unit duration disparity based on a duration disparity between third and fourth speech units in the student speech-unit data file that correspond to locations in the sequence of speech units of the first and second speech units in the reference speech-unit data file;
in a computer process, calculating a difference between the student speech-unit duration disparity and the reference speech-unit duration disparity; and
in a computer process, generating a sequence of student speech-unit duration differences by calculating a difference in duration between each unit in a sequence of speech units in the student speech sample and each other speech unit in the student speech sample.

7. The method of claim 6, further comprising:
in a computer process, calculating a difference in duration between each speech unit in a sequence of speech units in the reference speech sample and each other speech unit in the student speech sample, thereby generating a sequence of reference speech-unit duration differences corresponding in length to the sequence of student speech-unit duration differences.

8. The method of claim 7, further comprising:
in a computer process, summing an absolute value of each of the difference between a student speech-unit duration difference from the sequence of student speech-unit duration differences and a respective reference speech-unit duration difference from the sequence of reference speech-unit duration differences, to provide a difference sum;
in a computer process, summing an absolute value of each of the difference between a student speech-unit duration difference from the sequence of student speech-unit duration differences and an absolute value of a respective reference speech-unit duration difference from the sequence of reference speech-unit duration differences; to provide a total absolute sum; and
in a computer process, dividing the difference sum by the total absolute sum to provide the Pairwise variability error (PVE).

9. The method of claim 6, wherein a type of speech-unit is at least one of phonemes, syllables, or words.

10. The method of claim 6, further comprising:
scaling at least one of the reference speech sample or the student speech sample so that the total duration of the reference speech sample and the student speech sample are substantially the same.

11. The method of claim 6, further comprising:
in a computer process, calculating a difference in duration between each speech unit in a sequence of speech units in the reference speech sample and each other speech unit in the student speech sample, thereby generating a sequence of reference speech-unit duration differences corresponding in length to the sequence of student speech-unit duration differences.
determining the most granular level of speech in which a number of speech-units is the same for the reference speech sample and the student speech sample; and
comparing a characteristic of each speech-unit in the sequence of speech-units in the student speech sample with the characteristic of the corresponding speech-unit in the sequence of speech-units in the reference speech sample.

12. A method, comprising:
generating a reference speech-unit data file from a native language speaker sample and a student speech-unit data file from a language student speech sample, the reference speech-unit data file including a plurality of reference speech units from the native language speaker sample and the student speech-unit data file including a plurality of student speech units from the language student speech sample; and
in a computer process, generating a plurality of student speech-unit duration differences by calculating a difference in duration between each student speech unit from the plurality of student speech units and each other speech unit from the plurality of student speech units.

13. The method of claim 12, wherein a type of speech-unit is at least one of phonemes, syllables, or words.

14. The method of claim 12, further comprising:
scaling at least one of the native language speaker sample or the student speech sample so that the total duration of the native language speaker sample and the student speech sample are substantially the same.

\* \* \* \* \*